(12) United States Patent
Iida

(10) Patent No.: US 12,227,177 B2
(45) Date of Patent: Feb. 18, 2025

(54) VEHICLE CONTROL DEVICE AND VEHICLE CONTROL METHOD

(71) Applicant: Mitsubishi Electric Corporation, Tokyo (JP)

(72) Inventor: Koji Iida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 528 days.

(21) Appl. No.: 17/426,355

(22) PCT Filed: Apr. 1, 2019

(86) PCT No.: PCT/JP2019/014423
§ 371 (c)(1),
(2) Date: Jul. 28, 2021

(87) PCT Pub. No.: WO2020/202421
PCT Pub. Date: Oct. 8, 2020

(65) Prior Publication Data
US 2022/0097692 A1 Mar. 31, 2022

(51) Int. Cl.
*B60W 30/095* (2012.01)
(52) U.S. Cl.
CPC . *B60W 30/0956* (2013.01); *B60W 2554/4041* (2020.02)
(58) Field of Classification Search
CPC ...... B60W 30/0956; B60W 2554/4041; G01C 21/34
See application file for complete search history.

(56) References Cited

U.S. PATENT DOCUMENTS 5,684,696 A * 11/1997 Rao ............... G05D 1/0011
701/25
5,926,118 A * 7/1999 Hayashida ....... G01C 21/34
701/533

(Continued)

FOREIGN PATENT DOCUMENTS

JP H08159795 A * 6/1996 ............ G01C 21/00
JP 2010-83314 A 4/2010

OTHER PUBLICATIONS

Machine Translated JPH08159795A (Year: 1996).*

(Continued)

*Primary Examiner* — Anne Marie Antonucci
*Assistant Examiner* — Misa H Nguyen
(74) *Attorney, Agent, or Firm* — Sughrue Mion, PLLC

(57) ABSTRACT

There are included an own vehicle position sensor which detects the position of an own vehicle; a reference path acquisition unit which acquires a reference path on which the own vehicle travels; a reference path determination unit which determines whether or not the own vehicle is traveling on the reference path; a temporary vehicle path calculation unit which, when it is determined by the reference path determination unit that the own vehicle is not traveling on the reference path, calculates a temporary vehicle path from at least two points, a travel start point of the own vehicle and an end point of the reference path; and a vehicle path setting unit which sets either the temporary vehicle path calculated by the temporary vehicle path calculation unit or the reference path on which it is determined by the reference path determination unit that the own vehicle is traveling as the vehicle path of the own vehicle.

14 Claims, 12 Drawing Sheets

(56) References Cited

U.S. PATENT DOCUMENTS

| | | | |
|---|---|---|---|
| 9,827,985 B2* | 11/2017 | Yoo | B60W 30/09 |
| 10,372,136 B2* | 8/2019 | Yang | G01C 21/3691 |
| 10,386,846 B2* | 8/2019 | Matsuda | G05D 1/0274 |
| 10,710,581 B2* | 7/2020 | Düring | B60W 30/0953 |
| 11,400,927 B2* | 8/2022 | Deng | G01S 17/931 |
| 2019/0243370 A1* | 8/2019 | Li | G05D 1/0088 |

OTHER PUBLICATIONS

International Search report for PCT/JP2019/014423 dated, Jun. 11, 2019 (PCT/ISA/210).

Chinese Office Action issued Jan. 12, 2024 in Chinese Patent Application No. 201980094363.7.

Communication dated Jul. 27, 2024, issued in Chinese Application No. 201980094363.7.

* cited by examiner

VEHICLE CONTROL DEVICE AND VEHICLE CONTROL METHOD

CROSS REFERENCE TO RELATED APPLICATIONS

This application is a National Stage of International Application No. PCT/JP2019/014423 filed Apr. 1, 2019.

TECHNICAL FIELD

The present application relates to the field of a vehicle path generation device, a vehicle path generation method, and a vehicle control device.

BACKGROUND ART

As a method of predicting a vehicle path of a vehicle, there is, for example, a prediction using a movement model or a prediction utilizing a read shape (map). In the former prediction using a movement model, the vehicle path of the vehicle is predicted using a specified movement model based on a movement condition, such as speed or acceleration, of an object which has been observed and estimated with a sensor This method is such that the movement condition of the object is estimated with a high degree of accuracy and that the prediction in the extremely short term of, tor example, one second or less is high in accuracy. In the case of a long-term prediction, however, the movement condition changes from that of the present time, so that the accuracy of the prediction decreases.

Also, the latter prediction utilizing a road shape is such that as disclosed in, for example, PTL 1, it is predicted, by making use of the property "a vehicle travels along a road", that the road shape is of the predicted path of the object.

CITATION LIST

Patent Literature

Patent Literature 1: JP-A-2010-83314

SUMMARY OF INVENTION

Technical Problem

A heretofore known technology such as disclosed in PTL 1 is to calculate a predicted path using the road shape as mentioned above. However, this method is such that a predicted path is calculated from the road shape and the vehicle size, so that the predicted path is uniquely determined unless the road shape does not change over time. Consequently, even when the vehicle travels through a point deviating from a predicted vehicle path, the vehicle path will not be renewed, so that the error in physical quantities, such as the predicted vehicle path and the actual position or speed of the vehicle, comes to increase.

The present application has been made to solve the above problem, and an object of the present application is to provide a vehicle path generation device, a vehicle path generation method, and a vehicle control device which, even in a long-term vehicle path prediction, prevent a decrease in the accuracy of the prediction.

Solution to Problem

The vehicle path generation device disclosed in the present application, being a vehicle path generation device which acquires the position and orientation of an own vehicle from an own vehicle position sensor mounted on the own vehicle and generates a vehicle path of the own vehicle, includes a reference path acquisition circuitry which acquires the position and orientation of the own vehicle from the own vehicle position sensor and acquires a reference path of the own vehicle; a reference path determination circuitry which determines whether or not the own vehicle is traveling on the reference path, and when it determines that the own vehicle is traveling on the reference path, determines the reference path to be the vehicle path of the own vehicle; a temporary vehicle path calculation circuitry which, when it is determined by the determination of the reference path determination circuitry that the own vehicle is not traveling on the reference path, calculates a temporary vehicle path of the own vehicle from at least two points, the position of the own vehicle detected by the own vehicle position sensor and a point spaced apart by a set distance along the reference path; a temporary vehicle path determination circuitry which determines whether or not the own vehicle is traveling on the temporary vehicle path, and which, when the own vehicle is traveling on the temporary vehicle path, determines the temporary vehicle path to be the vehicle path of the own vehicle, and when the own vehicle is not traveling on the temporary vehicle path, revises the temporary vehicle path; and a vehicle path setting circuitry which sets either the vehicle path determined by the reference path determination circuitry or the vehicle path determined by the temporary vehicle path determination circuitry as the vehicle path of the own vehicle.

Advantageous Effects of Invention

According to the vehicle path generation device disclosed in the present application, it is possible, even in a long-term vehicle path prediction, to obtain a vehicle path generation device which prevents a decrease in the accuracy of the prediction.

DESCRIPTION OF EMBODIMENTS

Figure 1:
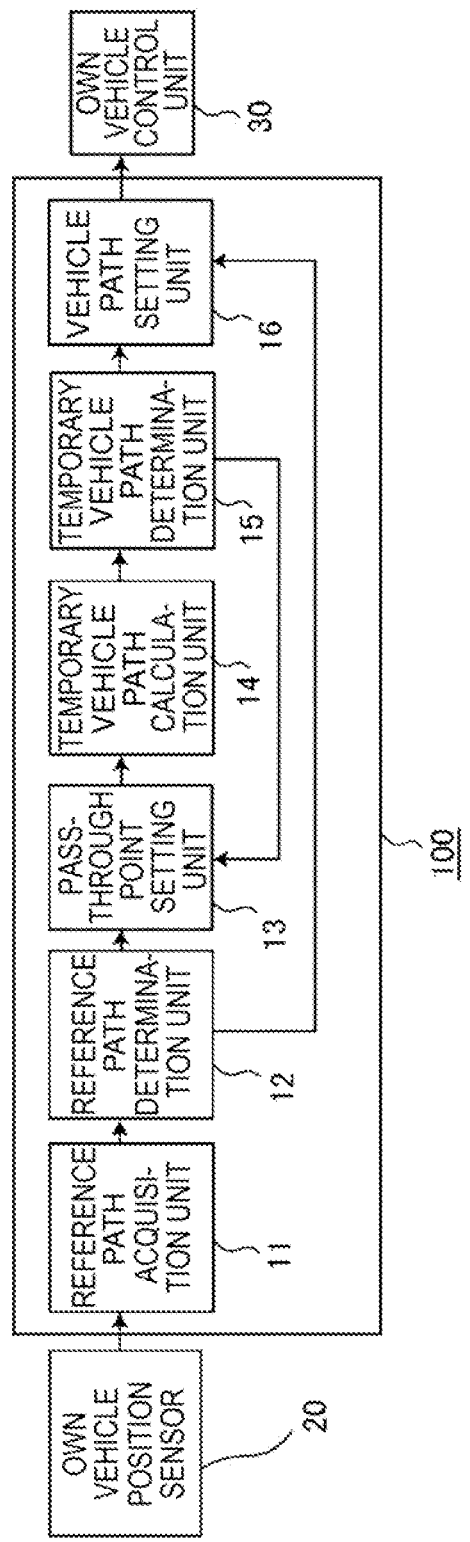
FIG. 1 is a block configuration diagram describing a vehicle path generation device according to a first embodiment.

Hereinafter, a description will be given, using the drawings, of preferred embodiments of a vehicle path generation device, a vehicle path generation method, and a vehicle control device according to the present application. In the drawings, identical signs show identical or equivalent portions.

First Embodiment

FIG. 1 is a block configuration diagram describing a vehicle path generation device according to the first embodiment.

In FIG. 1, a vehicle path generation device 100, as well as acquiring the position and orientation (direction) of an own vehicle from an own vehicle position sensor 20 (for example, a GPS and a geomagnetic sensor) mounted on the own vehicle, generates a vehicle path of the own vehicle in the following way, and outputs thus generated data to an own vehicle control unit 30. Then, the own vehicle control unit 30 controls the own vehicle so as to travel on the own vehicle path generated by the vehicle path generation device 100.

The vehicle path generation device 100 includes a reference path acquisition unit 11, a reference path determination unit 12, a pass-through point setting unit 13, a temporary vehicle path calculation unit 14, a temporary vehicle path determination unit 15, and a vehicle path setting unit 16.

The reference path acquisition unit 11 acquires a reference path of the own vehicle based on the position and orientation (direction) of the own vehicle acquired from the own vehicle position sensor 20. The reference path determination unit 12 determines whether or not to set the acquired reference path of the own vehicle as the vehicle path of the own vehicle, by comparing the present position and orientation (direction) of the own vehicle and the reference path of the own vehicle acquired from the reference path acquisition unit 11.

The pass-through point setting unit 13 sets a point through which the own vehicle passes. The temporary vehicle path calculation unit 14 calculates a temporary vehicle path using the point set by the pass-through point setting unit 13 and the position and orientation (direction) of the own vehicle. The temporary vehicle path determination unit 15 determines whether or not to set the temporary vehicle path calculated by the temporary vehicle path calculation unit 14 as the vehicle path of the own vehicle. The vehicle path setting unit 16 sets one of the reference path of the own vehicle determined by the reference path determination unit 12 or the vehicle path of the own vehicle determined by the temporary vehicle path determination unit 15 as the vehicle path of the own vehicle, and outputs thus generated data to the own vehicle control unit 30. The own vehicle control unit 30 controls the own vehicle in accordance with the generated data.

The vehicle path generation device 100 according to the first embodiment is configured as mentioned above, and a description will next be given of the operation thereof.

Figure 2:
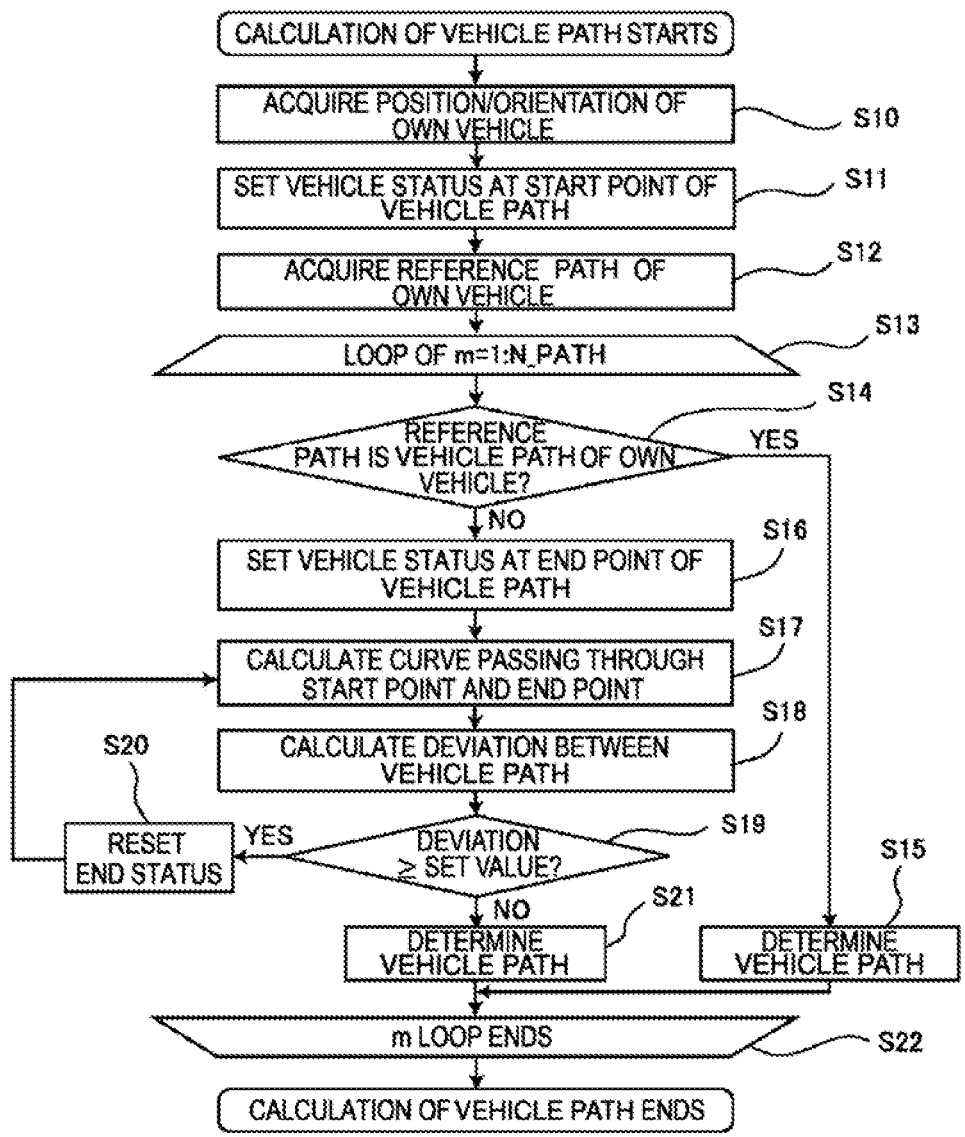
FIG. 2 is a flow chart describing the vehicle path generation device according to the first embodiment.

FIG. 2 is a flow chart describing the operation of the vehicle path generation device 100. In FIG. 2, the reference path acquisition unit 11 acquires the position and orientation (direction) of the own vehicle from the own vehicle position sensor 20 (Step S10) and sets the acquired position and orientation (direction) of the own vehicle as the vehicle condition at the start point of the vehicle path (Step S11). Then, based on the acquired position and orientation (direction) of the own vehicle, the vehicle path of the own vehicle is acquired, as the reference path of the own vehicle, from the road shape in map data maintained in advance (Step S12).

Figure 3:
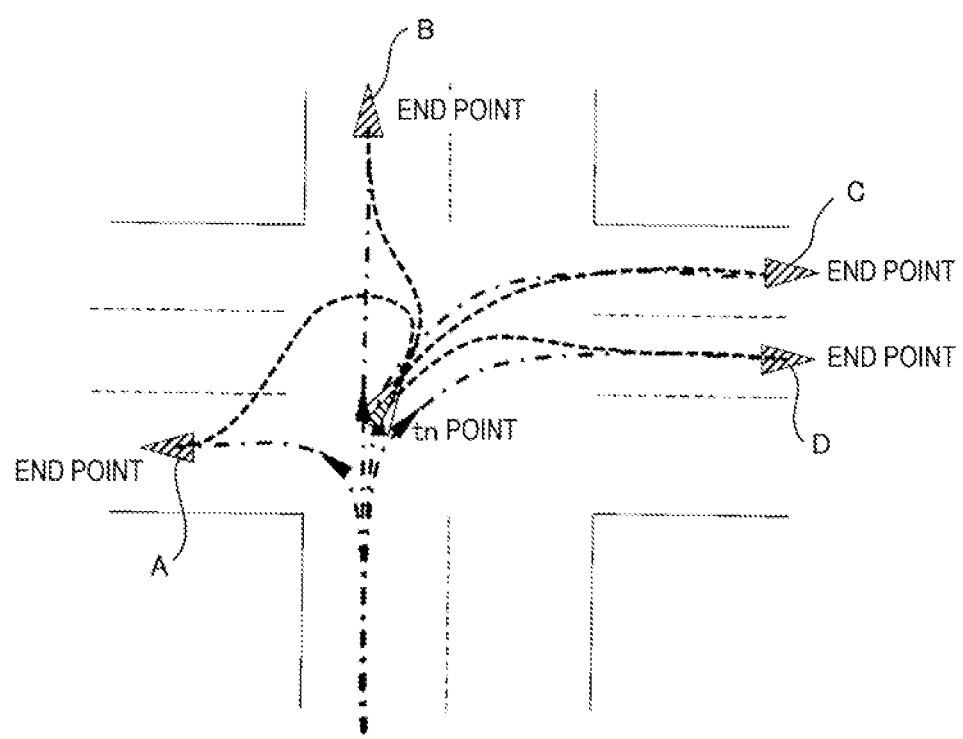
FIG. 3 is a diagram describing a plurality of vehicle paths acquired by a reference path acquisition unit according to the first embodiment.

At this time, when there are a plurality (N_PATH (n)) of paths in a predetermined range extending from the set start point of the vehicle path of the own vehicle (for example, when a plurality of end points shown by the signs A, B, C, and D can be set in an intersection such as shown in FIG. 3), all the N_PATH (n) paths are acquired, and an $i^{th}$ (i=1, 2, ... N_PATH (n)) path is represented as a reference path i of the own vehicle.

Then, out of the acquired N_PATH (n) reference paths, the $i^{th}$ path is selected to be the reference path i of the own vehicle, and the subsequent processing is carried out for i=1, 2, ... N_PATH (Step S13).

In FIG. 3, the dashed-dotted lines each show a reference path of the own vehicle, that is, a vehicle path obtained from the map, while the dashed lines each show a vehicle path of the own vehicle, that is, an actual vehicle path. Also, the black triangles each show the condition of the own vehicle at a travel point t (t=tn) of the reference path, that is, the position and orientation (direction), while the triangle indicated with the negatively sloped hatching (the −45-degree slanting lines) shows the condition, that is, the actual condition of the own vehicle at the travel point t (t=tn). The white triangle (the white filled triangle) shows the start point of the vehicle path of the own vehicle.

Next, the reference path determination unit 12 compares the present, position and orientation (direction) of the own vehicle and the reference path of the own vehicle and determines whether or not the reference path of the own vehicle is the vehicle path of the own vehicle (Step S14). When it is determined by the reference path determination unit 12 that the reference path of the own vehicle is the vehicle path of the own vehicle, the operation proceeds to Step S15, where the vehicle path setting unit 16 determines that the same reference path is the vehicle path of the own vehicle. When it is not determined by the vehicle path determination unit 12 that the reference path of the own vehicle is the vehicle path of the own vehicle, the operation proceeds to Step S16.

The determination of the reference path by the reference path determination unit 12 is to determine whether or not a difference do between the start point (the position of the vehicle) and the position of the reference path i of the own vehicle is equal to or greater than a set value. The value of the difference d0 can be calculated by drawing a perpendicular from a position E of the own vehicle to the reference path i of the own vehicle and obtaining the distance therefrom to the point of intersection of the perpendicular with the reference path i of the own vehicle. When the difference d0 is smaller than the set value, it is determined that the reference path i of the own vehicle is the vehicle path of the own vehicle, while when the difference d0 is equal to or greater than the set value, it is determined that the reference path i of the own vehicle is not the vehicle path of the own vehicle.

Next, when it is not determined by the reference path determination unit 12 that the selected reference path of the own vehicle is the vehicle path of the own vehicle, the pass-through point setting unit 13 sets a vehicle condition at the end point of the vehicle path of the own vehicle. That is, the end point of the vehicle path of the own vehicle to be calculated is set on the reference path i of the own vehicle (Step S16).

The end point of the vehicle path of the own vehicle is set to be a point spaced apart from the start point by a set distance along the reference path i of the own vehicle, and the distance is set to be a distance (v×t) the vehicle moves, for example, when it travels for t seconds at a present vehicle speed v. Also, the start point is determined based on the travel condition of the own vehicle at the present time.

Next, the temporary vehicle path calculation unit 14 calculates a curve passing through the set start and end points and sets the curve as a temporary vehicle path i' of the own vehicle (Step S17).

As the technique of calculating the curve passing through the set start and end points, there are techniques of using two or more positions and directions to calculate, for example, a clothoid curve whose curvature changes continuously, a polynomial approximate expression calculated from a polynomial, and a curve wherein a straight line, a spiral whose curvature changes monotonically, and a circle whose curvature is constant are combined together, and the curve, that, is, the temporary vehicle path i' of the own vehicle is calculated by using any one of the techniques.

Then, the temporary vehicle path calculation unit 14 calculates a deviation e of the temporary vehicle path i' of the own vehicle. That is, the difference between the reference path i of the own vehicle selected in Step S13 and the temporary vehicle path i' of the own vehicle calculated in Step S17 is calculated as the deviation e (Step S18).

Figure 5:
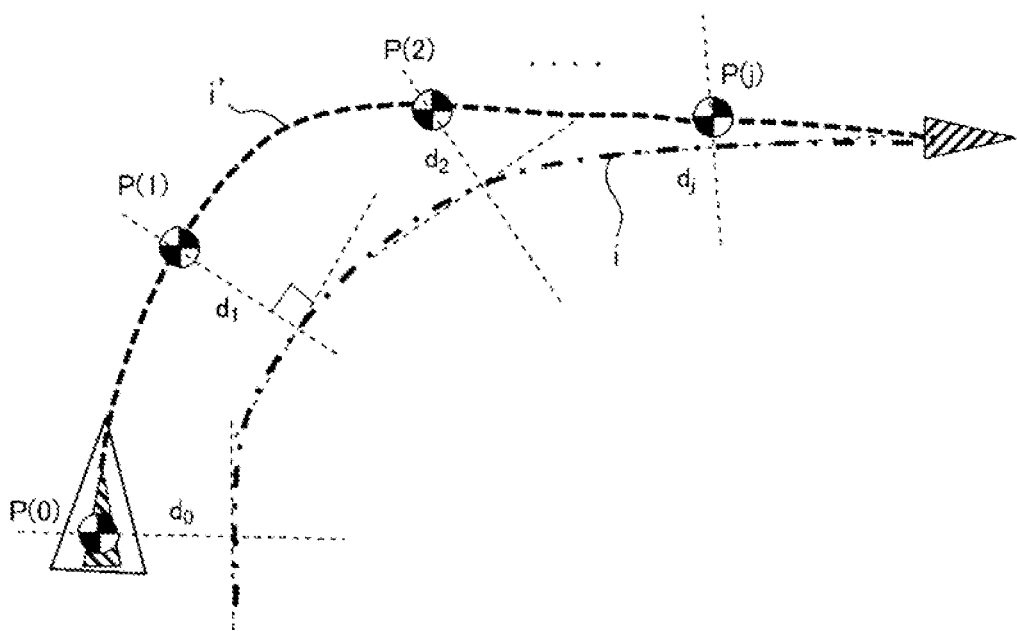
FIG. 5 is a diagram describing a method of calculating the deviation between the vehicle paths in a temporary vehicle path calculation unit according to the first embodiment.

The deviation e is calculated as shown in FIG. 5. That is, a point P(j) (j=1, 2, ... M) on the temporary vehicle path i' set at a predetermined distance, along the temporary vehicle path i', from the start point of the temporary vehicle path i' of the own vehicle indicated with the dashed line is obtained, and a perpendicular is drawn from the point P(j) (j=1, 2, ... M) to the reference path i of the own vehicle indicated with the dashed-dotted line, thus obtaining a distance d(j) to the point of intersection of the perpendicular with the reference path i of the own vehicle. This is carried out for each of M points P(j) (j=1, 2, ... M), and the average value of the distances d(j) is calculated to be the deviation e.

Next, the temporary vehicle path determination unit 15 carries out the determination of the deviation e. That is, it is determined whether or not the deviation e calculated in Step S18 is equal to or greater than the set value (Step S19).

Here, when the deviation e is equal to or greater than the set value, it shows that the temporary vehicle path i' of the own vehicle is a path differing substantially from the reference path i of the own vehicle. For this reason, it is determined that the own vehicle is actually less likely to travel, and the resetting of the end status is carried out (Step S20), and the operation returns to Step S17, where resetting of the temporary vehicle path i' of the own vehicle is carried out. Also, when the deviation e is smaller than the set value, it shows that the temporary vehicle path i' of the own vehicle is a vehicle path close to the reference path i of the own vehicle.

Then, the temporary vehicle path i' of the own vehicle calculated in Step S17 is determined to be the temporary vehicle path of the own vehicle (Step S21). In the vehicle path setting unit 16, the vehicle path set in Step S15, that is, the reference path is selected as the vehicle path of the own vehicle, and in other cases, the vehicle path determined in Step S21, that is, the temporary vehicle path is selected as the vehicle path of the own vehicle.

The resetting carried out in Step S20 is executed in the following way. That is, a value wherein the set value is added to the distance from the start point to the end point which is used in Step S11 is calculated, and a point on the reference path i of the own vehicle which is spaced apart by a value calculated from the start point, is newly set as the end point.

Next, in Step S22, the calculation is repeated for each of N_PATH (n) reference paths until the vehicle path of the own vehicle is calculated. When the calculation is not completed, the operation returns to Step S13.

The above processing from Step S10 to Step S22 is carried out, wherein out of the N_PATH (n) vehicle paths, one vehicle path of the own vehicle is selected (for example, a vehicle path whose deviation e is smallest is selected), and the own vehicle control unit 30 controls the own vehicle so as to travel on the vehicle path.

As described above in detail, according to the vehicle path generation device 100 of the first embodiment, it is possible, even in a long-term vehicle path prediction, to obtain a vehicle path generation device which prevents a decrease in the prediction accuracy.

Second Embodiment

Figure 6:
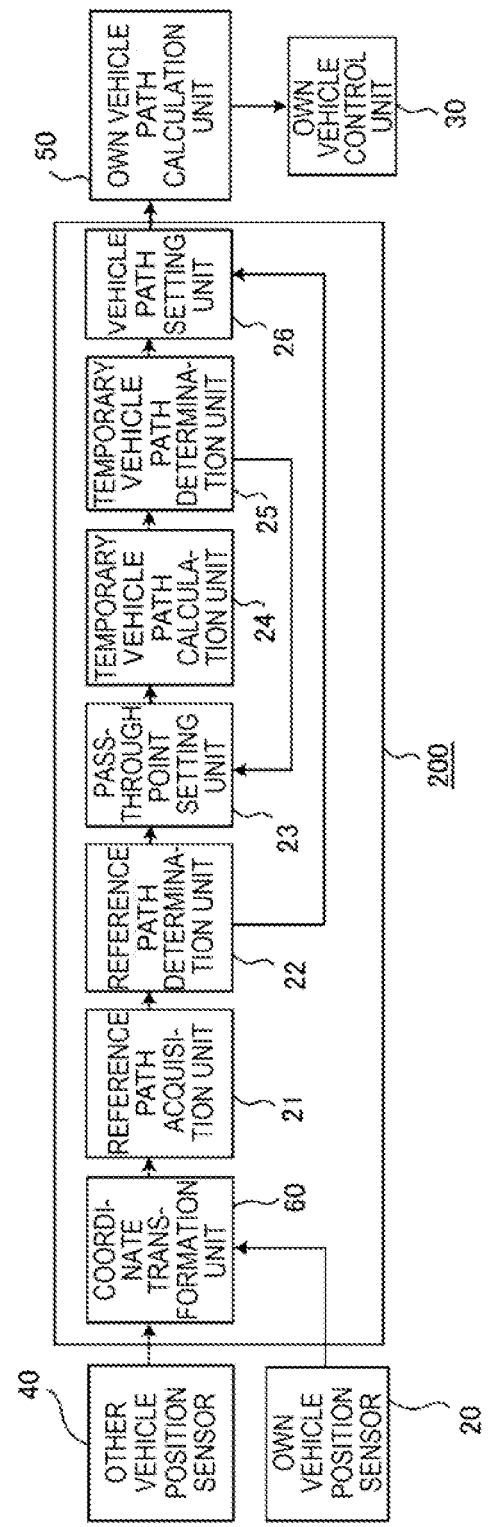
FIG. 6 is a block configuration diagram describing a vehicle path generation device according to a second embodiment.

Next, a description will be given of a vehicle path generation device according to the second embodiment. FIG. 6 is a block configuration diagram describing the vehicle path generation device according to the second embodiment.

In FIG. 6, a vehicle path generation device 200 acquires the position and orientation (direction) of the own vehicle from the own vehicle position sensor 20 (for example, a GPS and a geomagnetic sensor) mounted on the own vehicle. Also, an other vehicle position sensor 40 (for example, a millimeter-wave sensor or a camera) mounted on the own vehicle acquires the position and orientation (direction) of another vehicle, which exists in the vicinity of the own vehicle, when the position of the own vehicle is set to the origin. Subsequently, the vehicle path of the other vehicle is generated by the following method, and thus generated data are outputted to an own vehicle path calculation unit 50. The own vehicle path calculation unit 50 calculates the vehicle path of the own vehicle based on the vehicle path of the other vehicle generated by the vehicle path generation device 200, while the own vehicle control unit 30 controls the own vehicle so as to travel on the vehicle path of the own vehicle calculated by the own vehicle vehicle path calculation unit 50.

The vehicle path generation device 200 includes a coordinate transformation unit 60, a reference path acquisition unit 21, a reference path determination unit 22, a pass-through point setting unit 23, a temporary vehicle path calculation unit 24, a temporary vehicle path determination unit 25, and a vehicle path setting unit 26.

The coordinate transformation unit 60 transforms the position and orientation (direction) of the other vehicle into the values (for example, latitude/longitude) of the position and orientation (direction) on a coordinate system fixed to the ground, using the position and orientation (direction) of the own vehicle. The reference path acquisition unit 21 acquires the reference path of the other vehicle based on the position and orientation (direction) of the other vehicle. The reference path determination unit 22 determines whether or not to set the acquired reference path of the other vehicle as the vehicle path of the other vehicle, by comparing the present position and orientation (direction) of the own vehicle and the acquired reference path of the other vehicle.

The pass-through point setting unit 23 sets a point through which the other vehicle passes. The temporary vehicle path calculation unit 24 calculates the temporary vehicle path of the other vehicle, using the set pass-through point and the position and orientation (direction) of the other vehicle. The temporary vehicle path determination unit 25 determines whether or not to set the temporary vehicle path of the other vehicle, calculated by the temporary vehicle path calculation unit 24, as the vehicle path of the other vehicle. The vehicle path setting unit 26 sets one of the reference path of the other vehicle determined by the reference path determination unit 22 or the vehicle path of the other vehicle determined by the temporary vehicle path determination unit 25 as the vehicle path of the other vehicle. The own vehicle path calculation unit 50 calculates the vehicle path of the own vehicle so that the own vehicle will not come close to the vehicle path of the other vehicle. The own vehicle control unit 30 controls the own vehicle so as to travel on the vehicle path of the own vehicle calculated by the own vehicle path calculation unit 50.

The vehicle path generation device 200 according to the second embodiment is configured as mentioned above, and a description will next be given of the operation thereof.

Figure 7:
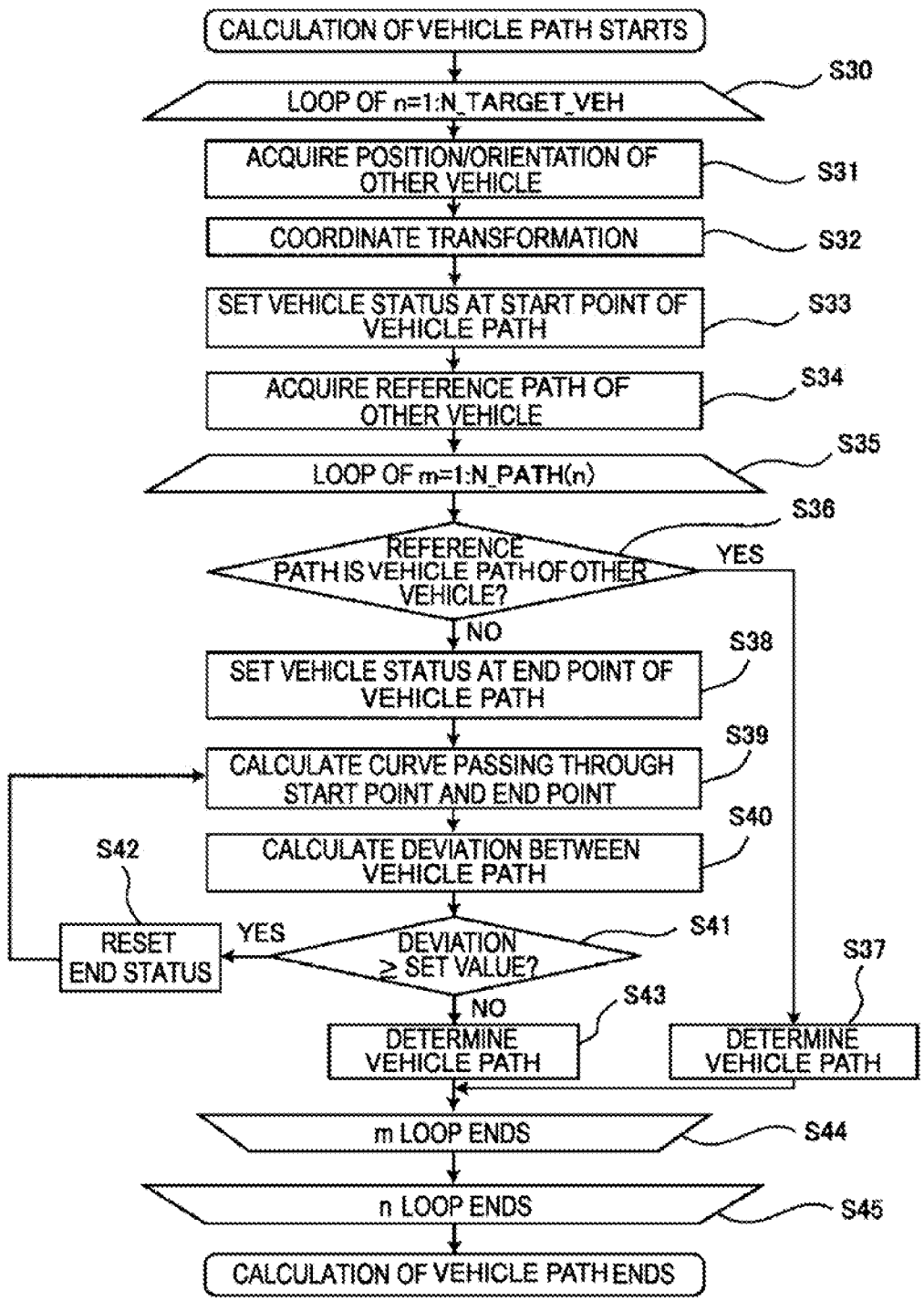
FIG. 7 is a flow chart describing the vehicle path generation device according to the second embodiment.

FIG. 7 is a flow chart describing the operation of the vehicle path generation device 200, and when the number of other vehicles acquired by the other vehicle position sensor 40 is taken to be N_TARGET_VEH(n), the flow chart describes a method of setting the vehicle paths of the other vehicles.

First, the other vehicle position sensor 40 selects one of the N_TARGET_VEH(n) other vehicles, the vehicle path of which is to be calculated, and acquires the position and orientation (direction) of the other vehicle (Step S30, Step S31).

When the position and orientation (direction) of the other vehicle acquired from the other vehicle position sensor 40 are of the values when the own vehicle is set as the reference (the origin), the coordinate transformation unit 60 transforms them into a coordinate system fixed to the ground, such as latitude/longitude/orientation (Step S32). For this reason, the position of the other vehicle in an own vehicle coordinate system is calculated based on the latitude/longitude/orientation of the own vehicle acquired by the own vehicle position sensor 20. Then, the calculated position and orientation (direction) of the other vehicle is set as the status of the other vehicle at the start point of the vehicle path (Step S33).

Next, the reference path acquisition unit 21 acquires the vehicle path of the other vehicle, as the reference path of the other vehicle, from the road shape in map data maintained in advance (Step S34), based on the calculated position and orientation (direction) of the other vehicle. At this time, when there are a plurality (N_PATH (n)) of paths in a predetermined range extending from the start point of the set vehicle path of the other vehicle (for example, when a plurality of end points can be set in an intersection such as shown in FIG. 3), all the N_PATH (n) paths are acquired, and an $i^{th}$ (i=1, 2, . . . N_PATH) path is represented as a reference path i of the other vehicle. Then, out of the acquired N_PATH (n) reference paths, the $i^{th}$ path is selected as the reference path i of the other vehicle, and the subsequent processing is carried out for i=1, 2, . . . N_PATH (Step S35).

Next, the reference path determination unit 22 determines whether or not the reference path of the other vehicle selected in Step S35 is the vehicle path of the other vehicle (Step S36), and when it is determined that it is the vehicle path of the other vehicle, the operation proceeds to Step S37, where it is determined that it is the vehicle path of the other vehicle, and when it is not determined that it is the vehicle path of the other vehicle, the operation proceeds to Step S38.

Figure 4:
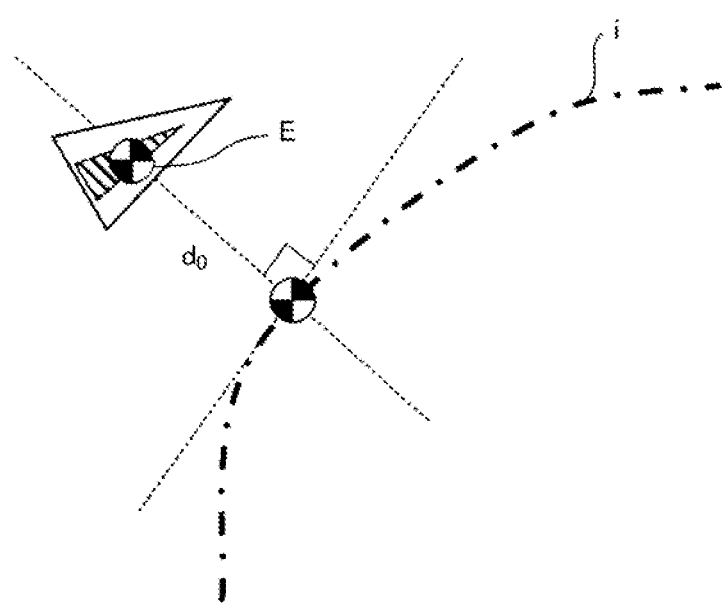
FIG. 4 is a diagram describing determination of a reference path in a reference path determination unit according to the first embodiment.

In this determination of the reference path, it is determined whether or not a difference d0 between the start point (the position of the other vehicle) and the position on the reference path i of the other vehicle is equal to or greater than the set value. The value of the difference d0 can be calculated by being obtained in the same way as by the method described in FIG. 4. When the difference d0 is smaller than the set value, it is determined that the reference path i of the other vehicle is the vehicle path of the other vehicle, and when the difference d0 is equal to or greater than the set value, it is determined that the reference path i of the other vehicle is not the vehicle path of the other vehicle.

Next, when it is determined by the reference path determination unit 22 that the reference path of the other vehicle is not the vehicle path of the other vehicle, the pass-through point setting unit 23 sets the vehicle status at the end point of the other vehicle. That is, the end point of the vehicle path of the other vehicle to be calculated is set on the reference path i of the other vehicle (Step S38).

The end point of the vehicle path of the other vehicle is set as a point spaced apart from the start point by a set distance along the reference path i, and the distance is set, for example, at a distance (v×t) the other vehicle moves when it travels for t seconds at a present vehicle speed v. Also, the start point is determined based on the travel condition of the other vehicle at the present time.

Next, the temporary vehicle path calculation unit 24 calculates a curve passing through the set start and end points, and calculates the curve as a temporary vehicle path i' of the other vehicle (Step S39).

The curve passing through the set start and end points can be calculated using the method described in the first embodiment.

Then, the temporary vehicle path calculation unit 24 calculates a deviation e of the temporary vehicle path i' of the other vehicle. That is, the difference between the reference path i of the other vehicle selected in Step S35 and the temporary vehicle path i' of the other vehicle calculated in Step S39 is calculated as the deviation e (Step S40).

The calculation of the deviation e can be obtained by the method described in FIG. 5 of the first embodiment.

Next, the temporary vehicle path determination unit 25 carries out the determination of the deviation e. That is, it is determined whether or not the deviation e calculated in Step S70 is equal to or greater than the set value (Step S41).

Here, when the deviation e is equal to or greater than the set value, it shows that the temporary vehicle path i' of the other vehicle is a path differing substantially from the reference path i of the other vehicle. For this reason, it is determined that the other vehicle is actually less likely to travel, resetting of the end status is carried out (Step S42), and the operation returns to Step S39, where resetting of the temporary vehicle path i' is carried out.

Also, when the deviation e is smaller than the set value, it snows that the temporary vehicle path i' of the other vehicle is a vehicle path close to the reference path i of the other vehicle.

Then, the temporary vehicle path i' of the other vehicle calculated in Step S39 is determined to be the temporary vehicle path of the other vehicle (Step S43). In the vehicle path setting unit 26, the vehicle path set in Step S37, that is, the reference path is selected as the vehicle path of the ether vehicle, and in other cases, the vehicle path set in Step S43, that is, the temporary vehicle path is selected as the vehicle path of the other vehicle.

The resetting carried out in Step S42 is executed in the following way. That is, a value wherein the set value is added to the distance from the start point to the end point which is used in Step S33 is calculated, and a point on the reference path i of the other vehicle, spaced apart by a value calculated from the start point, is newly set as the end point.

Next, the calculation is repeated for each of the N_PATH (n) reference paths of the other vehicle until the vehicle path of the other vehicle is calculated (Step S44), and when the calculation of the vehicle path of the other vehicle is not completed, the operation returns to Step S35.

Next, the calculation is repeated for each of the N_TARGET_VEH (n) other vehicles until the vehicle path of the other vehicle is calculated (Step S45), and when the calculation of the vehicle path of the other vehicle is not completed, the operation returns to Step S30.

The vehicle path generation device 200 according to the second embodiment carries out the processing from Step S30 to Step S45, and the N_PATH (n) vehicle paths of the other vehicle are calculated for each of the N_TARGET_VEH (n) other vehicles. In the own vehicle vehicle path calculation unit 50, it is determined whether all these vehicle paths of the other vehicle will not overlap the vehicle path on which the own vehicle is to travel from now, and when the vehicle path of the own vehicle comes close to a vehicle path of the other vehicle, the vehicle path of the own vehicle is revised. Then, the own vehicle is controlled by the own vehicle control unit 30 so as to travel on the vehicle path of the own vehicle.

As described above in detail, according to the vehicle path generation device 200 of the second embodiment, in the same way as in the first embodiment, it is possible, even in a long-term vehicle path prediction, to obtain a vehicle path generation device which prevents a decrease in the prediction accuracy.

Third Embodiment

Figure 8:
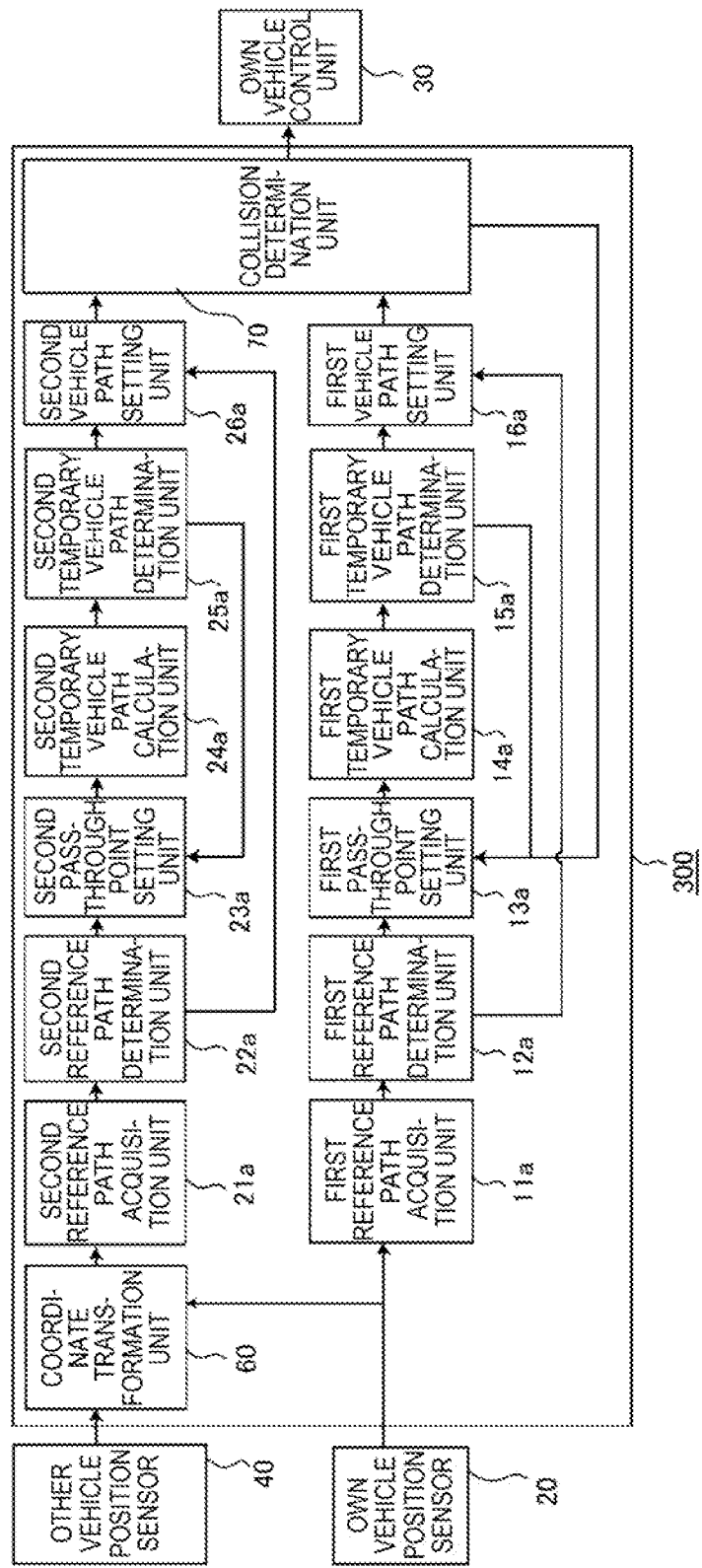
FIG. 8 is a block configuration diagram describing a vehicle path generation device according to a third embodiment.

Next, a description will be given of a vehicle path generation device according to the third embodiment. FIG. 8 is a block configuration diagram describing the vehicle path generation device according to the third embodiment.

In FIG. 8, a vehicle path generation device 300 acquires the position and orientation (direction) of the own vehicle from the own vehicle position sensor 20 (for example, a GPS and a geomagnetic sensor) mounted on the own vehicle. Also, the other vehicle position sensor 40 (for example, a millimeter-wave sensor or a camera) mounted on the own vehicle acquires the position and orientation (direction) of the other vehicle, which exists in the vicinity of the own vehicle, when the position of the own vehicle is set as the origin. Then, a vehicle path of the own vehicle is generated in the following way, and thus generated data are outputted to the own vehicle control unit 30. Then, the own vehicle control unit 30 controls the own vehicle based on the vehicle path generated by the vehicle path generation device 300.

The vehicle path generation device 300 includes the coordinate transformation unit 60, a first reference path acquisition unit 11a, a second reference path acquisition unit 21a, a first reference path determination unit 12a, a second reference path determination unit 22a, a first pass-through point setting unit 13a, a second pass-through point setting unit 23a, a first temporary vehicle path calculation unit 14a, a second temporary vehicle path calculation unit 24a, a first temporary vehicle path determination unit 15a, a second temporary vehicle path determination unit 25a, a first vehicle path setting unit 16a, a second vehicle path setting unit 26a, and a collision determination unit 70.

Here, the first reference path acquisition unit 11a, the first reference path determination unit 12a, the first pass-through point setting unit 13a, the first temporary vehicle path calculation unit 14a, the first temporary vehicle path determination unit 15a, and the first vehicle path setting unit 16a are respectively identical or equivalent in configuration to the reference path acquisition unit 11, the reference path determination unit 12, the pass-through point setting unit 13, the temporary vehicle path calculation unit 14, the temporary vehicle path determination unit 15, and the vehicle path setting unit 16 described in the first embodiment.

Also, the second reference path acquisition unit 21a, the second reference path determination unit 22a, the second pass-through point setting unit 23a, the second temporary vehicle path calculation unit 24a, the second temporary vehicle path determination unit 25a, and the second vehicle path setting unit 26a are respectively identical or equivalent in configuration to the reference path acquisition unit 21, the reference path determination unit 22, the pass-through point setting unit 23, the temporary vehicle path calculation unit 24, the temporary vehicle path determination unit 25, and the vehicle path setting unit 26 described in the second embodiment.

The first reference path acquisition unit 11a acquires the reference path of the own vehicle, based on the position and orientation (direction) of the own vehicle acquired from the own vehicle position sensor 20. The first reference path determination unit 12a determines whether or not to set the acquired reference path of the own vehicle as the vehicle path of the own vehicle, by comparing the present position and orientation (direction) of the own vehicle and the reference path of the own vehicle acquired from the first reference path acquisition unit 11a.

The first pass-through point setting unit 13a sets a point through which the own vehicle passes. The first temporary vehicle path calculation unit 14a calculates the temporary vehicle path of the own vehicle using the point set by the first pass-through point setting unit 13a and the position and orientation (direction) of the own vehicle. The first temporary vehicle path determination unit 15a determines whether or not to set the temporary vehicle path calculated by the first temporary vehicle path calculation unit 14a as the vehicle path of the own vehicle. The first vehicle path setting unit 16a determines one of the reference path of the own vehicle determined by the reference path determination unit 12 or the vehicle path of the own vehicle determined by the temporary vehicle path determination unit 15 to be the vehicle path of the own vehicle, and outputs it to the collision determination unit 70.

Also, the coordinate transformation unit 60 transforms the position of the other vehicle into the value of the position (for example, latitude/longitude) on a coordinate system fixed to the ground, using the position and orientation (direction) of the own vehicle. The second reference path acquisition unit 21a acquires the reference path of the other vehicle based on the position and orientation (direction) of the other vehicle. The second reference path determination unit 22a determines whether or not to set the acquired reference path of the other vehicle as the vehicle path of the other vehicle, by comparing the present position and orientation (direction) of the own vehicle and the acquired reference path of the other vehicle.

The second pass-through point setting unit 23a sets a point through which the other vehicle passes. The second temporary vehicle path calculation unit 24a calculates the temporary vehicle path of the other vehicle using the set pass-through point and the position and orientation (direction) of the other vehicle. The second temporary vehicle path determination unit 25a determines whether or not to set the temporary vehicle path of the other vehicle calculated by the second temporary vehicle path calculation unit 24a as the vehicle path of the other vehicle. The second vehicle path setting unit 26a determines one of the reference path of the other vehicle determined by the second reference path determination unit 22a or the vehicle path of the other vehicle determined by the second temporary vehicle path determination unit 25a to be the vehicle path of the other vehicle, and outputs it to the collision determination unit 70.

The collision determination unit 70 determines whether or not there is a possibility for the two vehicles to collide, based on the respective determined vehicle paths of the own and other vehicles, and outputs the vehicle path of the own vehicle with no possibility of collision to the own vehicle control unit 30. The own vehicle control unit 50 controls the own vehicle so as to travel on the vehicle path of the own vehicle outputted from the collision determination unit 70.

The vehicle path generation device 300 according to the third embodiment is configured as mentioned above, and a description will next be given of the operation thereof.

The vehicle path generation device 300 first calculates the vehicle path of the other vehicle existing in the vicinity of the own vehicle, and next generates a vehicle path of the own vehicle such as to maintain a certain distance between the vehicle path of the own vehicle and the vehicle path of the other vehicle, that is, a vehicle path of the own vehicle such as not to come close to the other vehicle. Then, the own vehicle is controlled so as to travel on the vehicle path.

Figure 9:
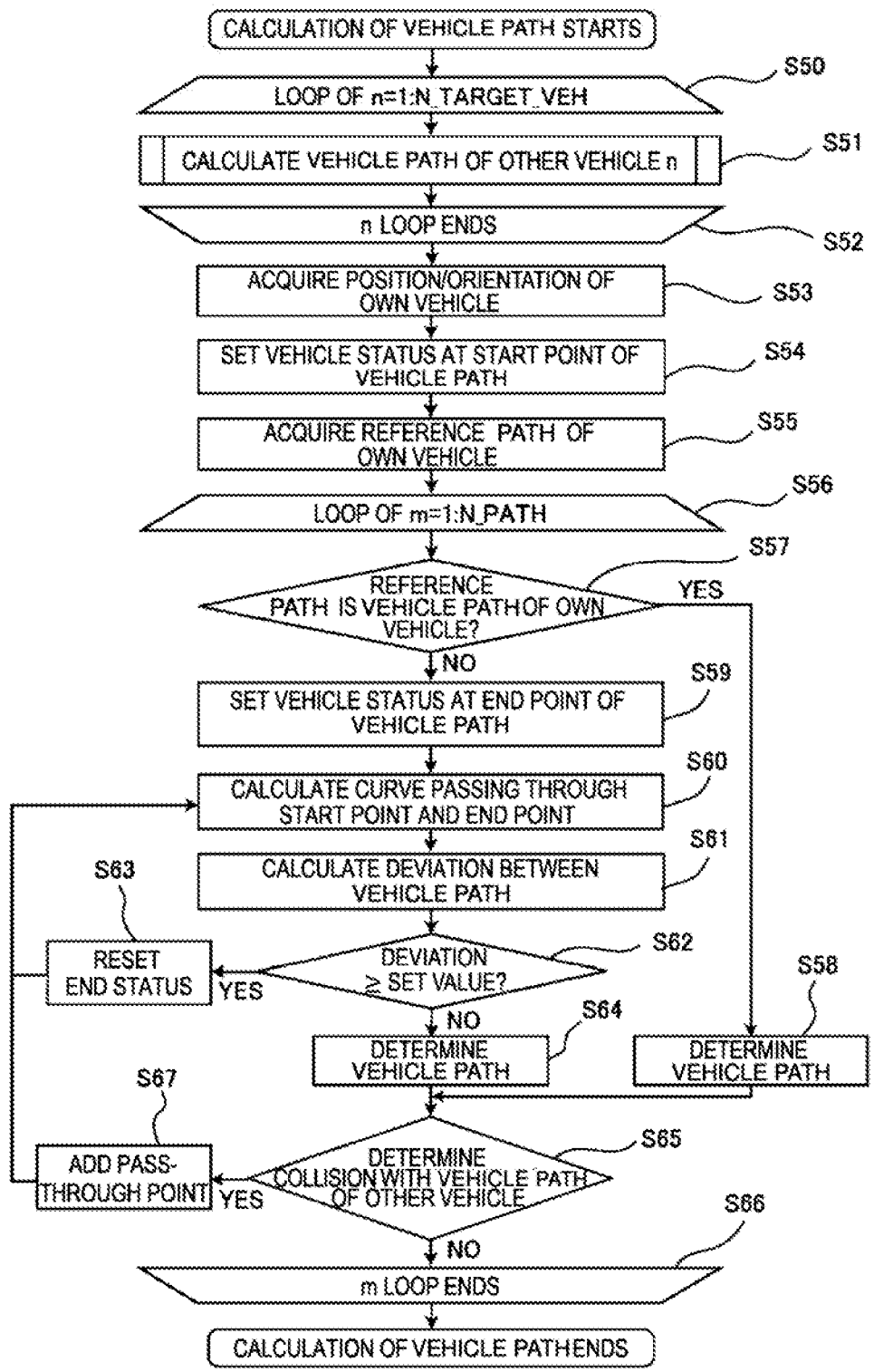
FIG. 9 is a flow chart describing the vehicle path generation device according to the third embodiment.

FIG. 9 is a flow chart describing the operation of the vehicle path generation device 300. In FIG. 9, first, one other vehicle whose vehicle path is to be calculated is selected from among the N_TARGET_VEH (n) other vehicles (Step S50), and the vehicle path of the selected other vehicle is calculated (Step S51). Then, the operation is repeated until the calculation of all the vehicle paths of the N_TARGET_VEH (n) other vehicles is completed (Step S52).

The above processing details from Step S50 to Step S52 are the same as the processing details described in the second embodiment, and the subsequent processing is to calculate the vehicle path of the own vehicle.

First, the first reference path acquisition unit 11a acquires the position and orientation (direction) of the own vehicle from the own vehicle position sensor 20 (Step S53), and sets the acquired position and orientation (direction) of the own vehicle as the vehicle status at the start point of the vehicle path (Step S54). Then, based on the acquired position and orientation (direction) of the own vehicle, the vehicle path of the own vehicle is acquired as the reference path of the own vehicle fronts the road shape in map data maintained in advance (Step S55).

At this time, when a plurality (N_PATH (n)) of paths exist in a predetermined range extending from the start point of the set vehicle path of the own vehicle (for example, when a plurality of end points shown by the signs A, B, C, and D can be set in an intersection such as shown in FIG. 3), all the N_PATH (n) paths are acquired, and an $i^{th}$ (i=1, 2, . . . N_PATH) path is represented as a reference path i of the own vehicle.

Then, out of the acquired N_PATH (n) reference paths, the $i^{th}$ path is selected as the reference path i of the own vehicle, and the subsequent processing is carried out for i=1, 2, . . . N_PATH (Step S56).

Next, the first reference path determination unit 12a determines whether or not the selected reference path of the own vehicle is the vehicle path of the own vehicle (Step S57), by comparing the present position and orientation (direction) of the own vehicle and the selected reference path of the own vehicle. When it is determined by the first reference path determination unit 12a that the selected reference path of the own vehicle is the vehicle path of the own vehicle, the operation proceeds to Step S58, where the first vehicle path setting unit 16a determines that the reference path is the vehicle path of the own vehicle. When it is not determined by the first reference path determination unit 12 that the reference path of the own vehicle is the vehicle path of the own vehicle, the operation proceeds to Step S59.

This determination of the reference path of the own vehicle by the first reference path determination unit 12a is to determine whether or not the difference d0 between the start point (the position of the vehicle) and the position of the reference path i is equal to or greater than the set value. The value of the difference d0 can be calculated by being obtained in the same way as by the method described in FIG. 4. When the difference d0 is smaller than the set value, it is determined that the reference path i of the own vehicle is the vehicle path of the own vehicle, and when the difference d0 is equal to or greater than the set value, it is determined that the reference path i of the own vehicle is not the vehicle path of the own vehicle.

Next, when it is not determined by the first reference path determination unit 12a that the selected reference path of the own vehicle is the vehicle path of the own vehicle, the first pass-through point setting unit 13a sets the vehicle status at the end point of the vehicle path of the own vehicle. That is, the end point of the vehicle path of the own vehicle to be calculated is set on the reference path i (Step S59).

The end point of the vehicle path of the own vehicle is set as a point spaced apart from the start point by a set distance along the reference path i of the own vehicle, and the distance is set as, for example, a distance (v×t) the own vehicle moves when the own vehicle travels for t seconds at a present vehicle speed v. Also, the start point is determined based on the travel condition of the other vehicle at the present time.

Next, the first temporary vehicle path calculation unit 14a calculates a curve passing through the set start and end points, and sets the curve as the temporary vehicle path i' of the own vehicle (Step S60).

The curve passing through the set start and end points can be calculated by using the method described in the first embodiment.

Then, the first temporary vehicle path calculation unit 14a calculates the deviation e of the temporary vehicle path i' of the own vehicle. That is, the difference between the reference path i of the own vehicle selected in Step S56 and the temporary vehicle path i' of the own vehicle calculated in Step S60 is calculated as the deviation e (Step S62).

The calculation of the deviation e can be obtained by the method described in FIG. 5 of the first embodiment.

Next, the first temporary vehicle path determination unit 15a carries out the determination of the deviation e. That is, it is determined whether or not the deviation e calculated in Step S61 is equal to or greater than the set value (Step S62).

Here, when the deviation e is equal to or greater than the set value, it shows that the temporary vehicle path i' of the own vehicle is a path differing substantially from the reference path i of the own vehicle. For this reason, it is determined that the own vehicle is actually less likely to travel, resetting of the end status is carried out (Step S63), and the operation returns to Step S60, where resetting of the temporary vehicle path i' of the own vehicle is carried out.

Also, when the deviation e is smaller than the set value, it shows that the temporary vehicle path i' of the own vehicle is a vehicle path close to the reference path i of the own vehicle.

Then, the temporary vehicle path i' of the own vehicle calculated in Step S60 is determined to be the temporary vehicle path of the own vehicle (Step S64). In the first vehicle path setting unit 16a, the vehicle path set in Step S58, that is, the reference path is selected as the vehicle path of the own vehicle, and in other cases, the vehicle path determined in Step S64, that is, the temporary vehicle path is selected as the vehicle path of the own vehicle.

The resetting carried out in Step S63 is executed in the following way. That is, a value wherein the set value is added to the distance from the start point to the end point which is used in Step S54 is calculated, and a point on the reference path i of the own vehicle, spaced apart, by a value calculated from the start point, is newly set as the end point.

Next, the collision determination unit 70 carries out determination of the possibility of collision between the vehicle path of the own vehicle determined in Step S58 or Step S64 and the vehicle path of the other vehicle generated in Step S50 to Step S52 (Step S65).

Figure 10A:
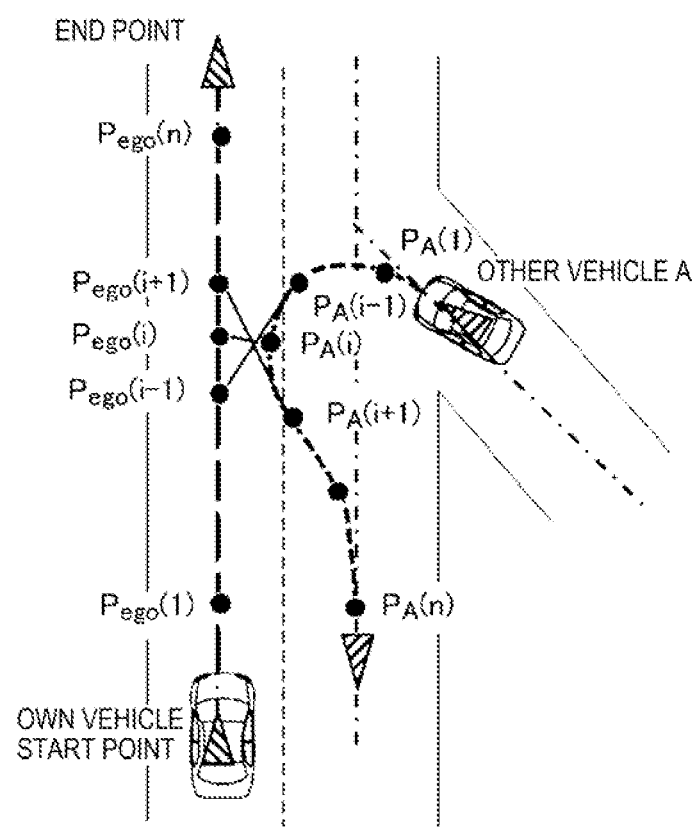
FIG. 10A is a diagram describing a result of determination in a collision determination unit according to the third embodiment.

FIG. 10A shows one example in which it is determined that there is the possibility of collision as the distance between a point Pego (i) of an $i^{th}$ own vehicle and a point PA (i) of another vehicle A is equal to or smaller than a specified distance. A description will later be given of the operation of carrying out this determination processing.

Figure 10B:
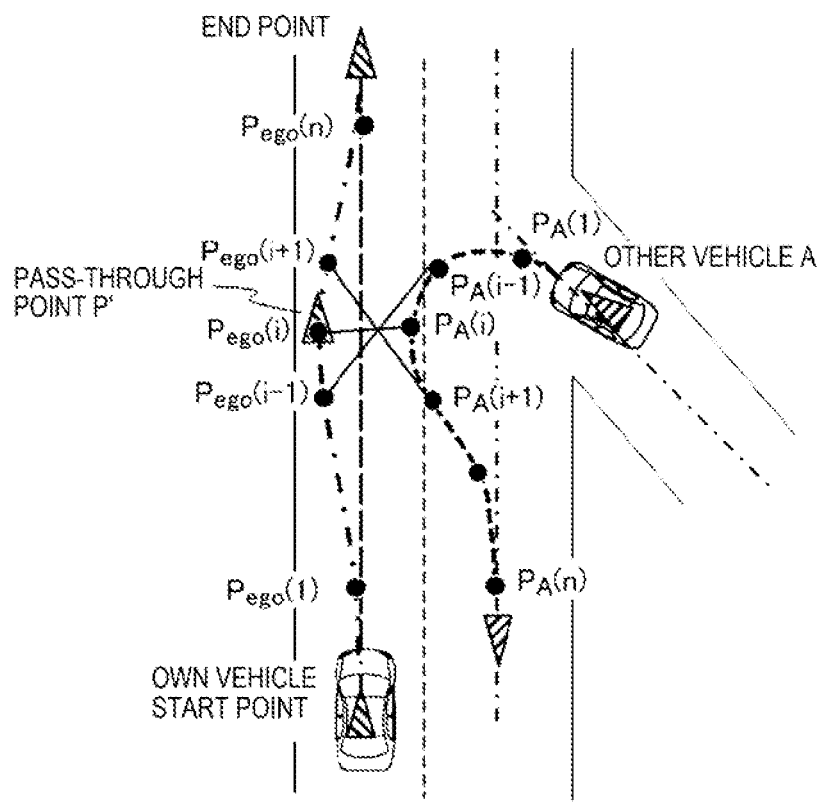
FIG. 10B is a diagram describing a result of determination in the collision determination unit according to the third embodiment.

When it is determined by the determination in Step S65 that there is no possibility of collision, the operation moves to Step S66, completing the processing. Also, when it is determined that there is the possibility of collision, the operation moves to Step S67, where addition of a closest pass-through point is carried out in order to revise the vehicle path of the own vehicle, and the operation returns to Step S60, where resetting of the temporary vehicle path i' of the own vehicle is carried out. FIG. 10B is one example showing the revised vehicle path of the own vehicle.

Figure 11:
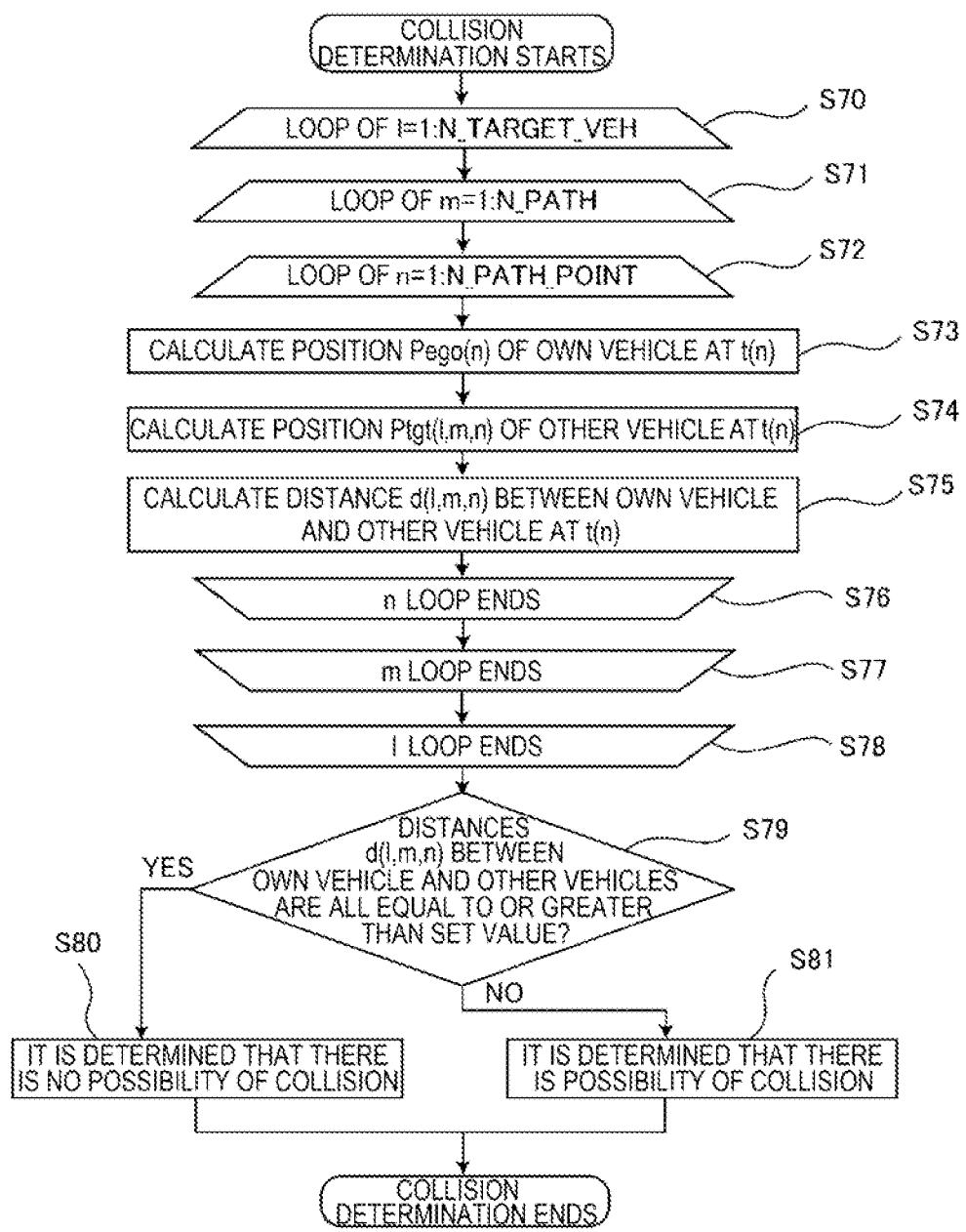
FIG. 11 is a flow chart describing a determination processing operation in the collision determination unit according to the third embodiment.

Next, a description will be given of the collision determination processing in the collision determination unit 70. FIG. 11 is a flow chart describing the operation of the determination processing in the collision determination unit 70.

In FIG. 11, first, a first other vehicle is selected out of a plurality of existing other vehicles (Step S70), and an $m^{th}$ path of the first other vehicle is selected (Step S73).

Next, an $n^{th}$ time t (n) obtained when a time period of T seconds after the start of travel is divided by a fixed interval of Δt seconds is selected (Step S72), and a position Pego (n) of the own vehicle at the time t (n) is calculated (Step S73).

Next, a position Ptgt (l, m, n) at the time t (n) on an $m^{th}$ path of another vehicle 1 is calculated (Step S74), and a distance d (l, m, n) between the own vehicle and the $m^{th}$ path of the other vehicle 1 at the time t (n) is calculated (Step S73).

Next, the operation is repeated until n=N_PATH_POINT finishes (Step S76), and the operation is repeated until m=N_PATH finishes (Step S77).

Next, the operation is repeated until I=N_TARGET_VEH finishes (Step S78). Then, it is determined whether or not the distances d (l, m, n) between the own vehicle and a plurality of other vehicles are all equal to or greater than a predetermined distance (Step S79).

When the distances d (l, m, n) between the own vehicle and the plurality of other vehicles are all equal to or greater than the predetermined distance as a result of the determination in Step S79, it is determined that there is no possibility of collision, and the vehicle path set by the first vehicle path setting unit 16a is outputted to the own vehicle control unit 30, thus finishing the operation (Step S80).

Also, when the distances d (l, m, n) between the own vehicle and the plurality of other vehicles are all smaller than the predetermined distance, it is determined that there is the possibility of collision, and stopping of the own vehicle is outputted to the own vehicle control unit 30 and, at the same time, a notice of the possibility of collision with any other vehicle is outputted, thus finishing the operation (Step S81).

The vehicle path generation device according to the third embodiment carries out the above processing from Step S50 to Step S67, wherein one of the N_PATH (n) vehicle paths is selected (for example, a vehicle path whose deviation is smallest is selected), and the own vehicle control unit 30 controls the own vehicle so as to travel on the selected vehicle path.

As described above in detail, according to the vehicle path generation device of the third embodiment, in the same way as in the first embodiment, it is possible, even in a long-term vehicle path prediction, to obtain a vehicle path generation device which prevents a decrease in the prediction accuracy.

Figure 12:
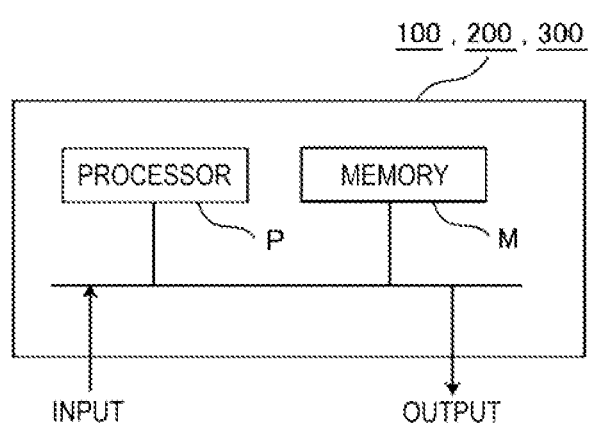
FIG. 12 is a diagram showing one example of hardware of the vehicle path generation device according to the first to third embodiments.

A description has heretofore been given of the vehicle path generation device, vehicle path generation method, and vehicle control device according to each of the first to third embodiments of the present application, but the vehicle path generation device 100, 200, 300 described in each embodiment is configured of a processor P and a memory M as one example of hardware is shown in FIG. 12. The memory M includes, although not shown, a volatile memory such as a random access memory and a non-volatile auxiliary memory such as a flash memory. Also, the memory M may include an auxiliary memory such as a hard disk in place of a flash memory. The processor P executes a program inputted from the memory M. In this case, the program is inputted into the processor P from the auxiliary memory via the volatile memory. Also, the processor P may output data, such as a calculation result, to the volatile memory of the memory M, and also may store the data in the auxiliary memory via the volatile memory.

Although the present application is described above in terms of various exemplary embodiments and implementations, it should be understood that the various features, aspects, and functionality described in one or more of the individual embodiments are not limited in their applicability to the particular embodiment, with which they are described, but instead can be applied, alone or in various combinations, to one or more of the embodiments.

It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF REFERENCE NUMERALS AND SIGNS 11, 21 reference path acquisition unit, 11a first; reference path acquisition unit, 21a second reference path acquisition unit, 12, 22 reference path determination unit, 12a first reference path determination unit, 22a second reference path determination unit, 13, 23 pass-through point setting unit, 13a first pass-through point setting unit, 23a second pass-through point setting unit, 14, 24 temporary vehicle path calculation unit, 14a first temporary vehicle path calculation unit, 24a second temporary vehicle path calculation unit, 15, 25 temporary vehicle path determination unit, 15a first temporary vehicle path determination unit, 25a second temporary vehicle path determination unit, 16, 26 vehicle path setting unit, 16a first vehicle path setting unit, 26a second vehicle path setting unit, 20 own vehicle position sensor, 30 own vehicle control unit, 40 other vehicle position sensor, 50 own vehicle path calculation unit, 60 coordinate transformation unit, 100, 200, 300 vehicle path generation device, F processor, M memory

The invention claimed is:

1. A vehicle control device comprising a vehicle path generation device which acquires the position and orientation of an own vehicle from an own vehicle position sensor mounted on the own vehicle and generates a vehicle path of the own vehicle, the vehicle path generation device being characterized by including:
   a reference path acquisition circuitry which acquires the position and orientation of the own vehicle from the own vehicle position sensor and acquires, from a map, a plurality of reference paths of the own vehicle that extend in different directions from the current position of the own vehicle at a road intersection;
   a reference path determination circuitry which determines a reference path that is within a predetermined distance from an actual path of the vehicle and that has a smallest deviation from the actual path of the vehicle, among the plurality of reference paths, determines whether or not the own vehicle is traveling on the reference path, and when it determines that the own vehicle is traveling on the reference path, determines the reference path to be the vehicle path of the own vehicle;
   a temporary vehicle path calculation circuitry which, when it is determined by the determination of the reference path determination circuitry that the own vehicle is not traveling on the reference path and the reference path is within a predetermined distance from the position of the own vehicle, sets a curve connecting at least two points as a temporary vehicle path of the own vehicle, wherein the at least two points include the position of the own vehicle detected by the own vehicle position sensor and a point spaced apart from the position of the own vehicle by a set distance and located on the reference path;
   a temporary vehicle path determination circuitry which determines whether or not the own vehicle is traveling on the temporary vehicle path, and which, when the own vehicle is traveling on the temporary vehicle path, determines the temporary vehicle path to be the vehicle path of the own vehicle, and when the own vehicle is not traveling on the temporary vehicle path, revises the temporary vehicle path; and
   a vehicle path setting circuitry which sets either the vehicle path determined by the reference path determination circuitry or the vehicle path determined by the temporary vehicle path determination circuitry as the vehicle path of the own vehicle,
   wherein the vehicle control device further comprises an own vehicle control circuitry that controls the own vehicle based on the vehicle path generated by the vehicle path generation device.

2. The vehicle path generation device according to claim 1, characterized in that
   the revision of the temporary vehicle path is carried out when the deviation between the reference path and the temporary vehicle path is equal to or greater than a set value.

3. The vehicle control device of claim 1, further including:
   an own vehicle position sensor mounted on the own vehicle.

4. A vehicle control device comprising a vehicle path generation device which acquires the position and orientation of an own vehicle from an own vehicle position sensor mounted on the own vehicle and generates a vehicle path of the own vehicle, and which acquires the position and orientation of another vehicle from an other vehicle position sensor mounted on the own vehicle and generates a vehicle path of the other vehicle, the vehicle path generation device being characterized by including:
   a first reference path acquisition circuitry which acquires the position and orientation of the own vehicle from the own vehicle position sensor and acquires, from a map, a plurality of reference paths of the own vehicle that extend in different directions from the current position of the own vehicle at a road intersection;
   a first reference path determination circuitry which determine a reference path that is within a predetermined distance from an actual path of the vehicle and that has a smallest deviation from the actual path of the vehicle, among the plurality of reference paths, determines whether or not the own vehicle is traveling on the reference path, and when the own vehicle is traveling on the reference path, determines the reference path to be the vehicle path of the own vehicle;
   a first temporary vehicle path calculation circuitry which, when it is determined by the determination of the first reference path determination circuitry that the own vehicle is not traveling on the reference path and the reference path is within a predetermined distance from the position of the own vehicle, sets a curve connecting at least two points as a temporary vehicle path of the own vehicle, wherein the at least two points include the position of the own vehicle detected by the own vehicle position sensor and a point spaced apart from the position of the own vehicle by a set distance and located on the reference path of the own vehicle;
   a first temporary vehicle path determination circuitry which determines whether or not the own vehicle is traveling on the temporary vehicle path calculated by the first temporary vehicle path calculation circuitry, and which, when the own vehicle is traveling on the temporary vehicle path, determines the temporary vehicle path to be the vehicle path of the own vehicle, and when the own vehicle is not traveling on the temporary vehicle path, revises the temporary vehicle path;

a first vehicle path setting circuitry which sets either the vehicle path determined by the first reference path determination circuitry or the vehicle path determined by the first temporary vehicle path determination circuitry as the vehicle path of the own vehicle;

a second reference path acquisition circuitry which acquires the position and orientation of the other vehicle from the other vehicle position sensor and acquires a reference path of the other vehicle;

a second reference path determination circuitry which determines whether or not the other vehicle is traveling on the reference path, and when it determines that the other vehicle is traveling on the reference path, determines the reference path to be the vehicle path of the other vehicle;

a second temporary vehicle path calculation circuitry which, when it is determined by the determination of the second reference path determination circuitry that the other vehicle is not traveling on the reference path, calculates a temporary vehicle path of the other vehicle from at least two points, the position of the other vehicle detected by the other vehicle position sensor and a point spaced apart by a set distance along the reference path;

a second temporary vehicle path determination circuitry which determines whether or not the other vehicle is traveling on the temporary vehicle path, and which, when the other vehicle is traveling on the temporary vehicle path, determines the temporary vehicle path to be the vehicle path of the other vehicle, and when the other vehicle is not traveling on the temporary vehicle path, revises the temporary vehicle path;

a second vehicle path setting circuitry which sets either the vehicle path determined by the second reference path determination circuitry or the vehicle path determined by the second temporary vehicle path determination circuitry as the vehicle path of the other vehicle; and a collision determination circuitry which determines whether or not there is a possibility that the own vehicle and the other vehicle collide with each other, based on the vehicle path of the own vehicle determined by the first vehicle path setting circuitry and on the vehicle path of the other vehicle determined by the second vehicle path setting circuitry, wherein the vehicle control device further comprises an own vehicle control circuitry which controls the own vehicle based on the vehicle path generated by the vehicle path generation device.

5. The vehicle control device of claim 4, further including: an own vehicle position sensor mounted on an own vehicle.

6. The vehicle control device according to claim 5, characterized in that the own vehicle control circuitry causes the own vehicle to stop based on the output of the collision determination circuitry.

7. The vehicle control device according to claim 5, characterized in that the own vehicle control circuitry outputs a notice of possibility of collision with the other vehicle based on the output of the collision determination circuitry.

8. A vehicle control method comprising a vehicle path generation method which acquires the position and orientation of an own vehicle from an own vehicle position sensor mounted on the own vehicle and generates a vehicle path of the own vehicle, the vehicle path generation method being characterized by including:

a first step which acquires the position and orientation of the own vehicle;

a second step which acquires, from a map, a plurality of reference paths of the own vehicle that extend in different directions from the current position of the own vehicle at a road intersection;

a third step which determines a reference path that is within a predetermined distance from an actual path of the vehicle and that has a smallest deviation from the actual path of the vehicle, among the plurality of reference paths, determines whether or not the own vehicle is traveling on the reference path, and when determining that the own vehicle is traveling on the reference path, determines the reference path to be the vehicle path of the own vehicle;

a fourth step which, when it is determined that the own vehicle is not traveling on the reference path and the reference path is within a predetermined distance from the position of the own vehicle, sets a curve connecting at least two points as a temporary vehicle path of the own vehicle, wherein the at least two points include the position of the own vehicle and a point spaced apart from the position of the own vehicle by a set distance and located on the reference path;

a fifth step which determines whether or not the own vehicle is traveling on the temporary vehicle path, and which, when the own vehicle is traveling on the temporary vehicle path, determines the temporary vehicle path to be the vehicle path of the own vehicle, and when the own vehicle is not traveling on the temporary vehicle path, carries out a revision of the temporary vehicle path; and a sixth step which sets either the vehicle path determined in the third step or the vehicle path determined in the fifth step as the vehicle path of the own vehicle, wherein the vehicle control method further comprises controlling the own vehicle based on the vehicle path generated by the vehicle path generation method.

9. The vehicle path generation method according to claim 8, characterized in that the revision of the temporary vehicle path is carried out by resetting one or both of an end point at which to calculate the temporary vehicle path and a pass-through point of the own vehicle other than two points, a start point at which to calculate the temporary vehicle path and the end point at which to calculate the temporary vehicle path.

10. The vehicle path generation method according to claim 9, characterized in that the start point of the temporary vehicle path is determined by the traveling condition of the own vehicle at the present time.

11. The vehicle path generation method according to claim 9, characterized in that the end point of the temporary vehicle path is set on the reference path.

12. The vehicle path generation method according to claim 8, characterized in that when a plurality of reference path end points can be set for the own vehicle, the reference path is calculated for each of the plurality of reference path end points.

13. The vehicle path generation method according to claim 8, characterized in that
when a plurality of temporary vehicle path end points can be set for the own vehicle, the temporary vehicle path is calculated for each of the plurality of temporary vehicle path end points.

14. A vehicle control method comprising a vehicle path generation method which acquires the position and orientation of an own vehicle from an own vehicle position sensor mounted on the own vehicle and generates a vehicle path of the own vehicle, and which acquires the position and orientation of another vehicle from an other vehicle position sensor mounted on the own vehicle and generates a vehicle path of the other vehicle, the vehicle path generation method being characterized by including:

a first step which acquires the position and orientation of the own vehicle;

a second step which acquires, from a map, a plurality of reference paths of the own vehicle that extend in different directions from the current position of the own vehicle at a road intersection;

a third step which determines a reference path that is within a predetermined distance from an actual path of the vehicle and that has a smallest deviation from the actual path of the vehicle, among the plurality of reference paths, determines whether or not the own vehicle is traveling on the reference path, and when it is determined that the own vehicle is traveling on the reference path, determines the reference path to be the vehicle path of the own vehicle;

a fourth step which, when it is determined that the own vehicle is not traveling on the reference path and the reference path is within a predetermined distance from the position of the own vehicle, sets a curve connecting at least two points as a temporary vehicle path of the own vehicle, wherein the at least two points, the position of the own vehicle and a point spaced apart from the position of the own vehicle by a set distance and located on the reference path;

a fifth step which determines whether or not the own vehicle is traveling on the temporary vehicle path, and which, when the own vehicle is traveling on the temporary vehicle path, determines the temporary vehicle path to be the vehicle path of the own vehicle, and when the own vehicle is not traveling on the temporary vehicle path, carries out a revision of the temporary vehicle path;

a sixth step which sets either the vehicle path determined in the third step or the vehicle path determined in the fifth step as the vehicle path of the own vehicle;

a seventh step which acquires the position and orientation of the other vehicle;

an eighth step which acquires a reference path of the other vehicle based on the position and orientation of the other vehicle acquired in the seventh step;

a ninth step which determines whether or not the other vehicle is traveling on the reference path, and when it is determined that the other vehicle is traveling on the reference path, determines the reference path to be the vehicle path of the other vehicle;

a tenth step which, when it is determined that the other vehicle is not traveling on the reference path, calculates a temporary vehicle path of the other vehicle from at least two points, the position of the other vehicle and a point spaced apart by a set distance along the reference path;

an eleventh step which determines whether or not the other vehicle is traveling on the temporary vehicle path, and which, when it is determined that the other vehicle is traveling on the temporary vehicle path, determines the temporary vehicle path to be the vehicle path of the other vehicle, and when the other vehicle is not traveling on the temporary vehicle path, carries out a revision of the temporary vehicle path;

a twelfth step which sets either the vehicle path determined in the ninth step or the vehicle path determined in the eleventh step as the vehicle path of the other vehicle; and a thirteenth step which determines whether or not there is a possibility that the own vehicle and the other vehicle collide with each other, based on the vehicle path of the own vehicle set in the sixth step and on the vehicle path of the other vehicle set in the twelfth step, wherein the vehicle control method further comprises controlling the own vehicle based on the vehicle path generated by the vehicle path generation method.

* * * * *